(12) United States Patent
Bartczak et al.

(10) Patent No.: US 12,327,468 B1
(45) Date of Patent: Jun. 10, 2025

(54) DEVICE, METHOD AND SYSTEM FOR EMERGENCY PERSONAL DATA ACCESS USING DIFFERENT COMMUNICATION INTERFACE TYPES

(71) Applicant: MOTOROLA SOLUTIONS, INC., Chicago, IL (US)

(72) Inventors: Piotr Bartczak, Cracow (PL); Adrian Dybczak, Cracow (PL); Piotr Zdankiewicz, Cracow (PL); Michal Kamon, Zielonki (PL); Przemyslaw Pleciak, Cracow (PL); Jakub Galas, Tarnow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 10 days.

(21) Appl. No.: 18/534,955

(22) Filed: Dec. 11, 2023

(51) Int. Cl.
*G08B 25/01* (2006.01)
*G08B 25/00* (2006.01)

(52) U.S. Cl.
CPC ......... *G08B 25/016* (2013.01); *G08B 25/007* (2013.01)

(58) Field of Classification Search
CPC ........................... G08B 25/016; G08B 25/007
See application file for complete search history.

(56) References Cited

U.S. PATENT DOCUMENTS

| | | | |
|---|---|---|---|
| 8,516,122 B2 | 8/2013 | Piett et al. | |
| 8,819,785 B2 | 8/2014 | Robbins et al. | |
| 9,641,226 B2 | 5/2017 | Choi et al. | |
| 10,002,199 B2 | 6/2018 | Soto Matamala et al. | |
| 10,979,882 B2 | 4/2021 | Lihosit et al. | |
| 2006/0252998 A1* | 11/2006 | Kimbrell | H04M 1/72418 600/300 |
| 2018/0204438 A1* | 7/2018 | Cullin | G08B 25/009 |
| 2022/0232373 A1* | 7/2022 | Dees | H04W 4/023 |
| 2022/0322061 A1* | 10/2022 | King-Berkman | H04W 4/02 |
| 2023/0063013 A1 | 3/2023 | Barash et al. | |
| 2023/0101005 A1 | 3/2023 | Byington et al. | |

FOREIGN PATENT DOCUMENTS

| | | |
|---|---|---|
| CA | 2702237 C | 12/2013 |
| JP | 2001197189 A | 7/2001 |

* cited by examiner

*Primary Examiner* — Omeed Alizada
(74) *Attorney, Agent, or Firm* — PERRY + CURRIER INC.

(57) ABSTRACT

A first mobile device receives actuation of a victim assistance button of an emergency assistance application associated with a first identifier of a first emergency profile associated with a first user of the first mobile device. The first mobile device receives, from a second mobile device, using a short-range communication interface, a second identifier of a second emergency profile associated with a second user of the second mobile device, the second identifier being encrypted and decryptable using a common decryption key associated with the emergency assistance application. The first mobile device decrypts the second identifier using the common decryption key, and provides, to an emergency service provider server, using a long-range communication interface, the second identifier that enables the emergency service provider server to retrieve the second emergency profile from a data storage module of an emergency information system at which the first and second emergency profiles are registered.

20 Claims, 7 Drawing Sheets

US 12,327,468 B1

DEVICE, METHOD AND SYSTEM FOR EMERGENCY PERSONAL DATA ACCESS USING DIFFERENT COMMUNICATION INTERFACE TYPES

BACKGROUND OF THE INVENTION

In emergency situations and/or public safety incidents, mobile devices may be used to notify emergency service providers. However, in instances where a user of a first mobile device is notifying an emergency service provider regarding an incapacitated user of a second mobile device, information that the user of the first mobile device is able to provide to the emergency service provider regarding the incapacitated user may be limited, which may result in a condition of the incapacitated user becoming worse, and/or dispatch of incorrect first responders, or incorrectly equipped first responders, to an incident scene to attend to the incapacitated user. Such a dispatch may generally waste wasting processing resources, fuel, and the like, at least in order to later resolve the emergency situation and/or public safety incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
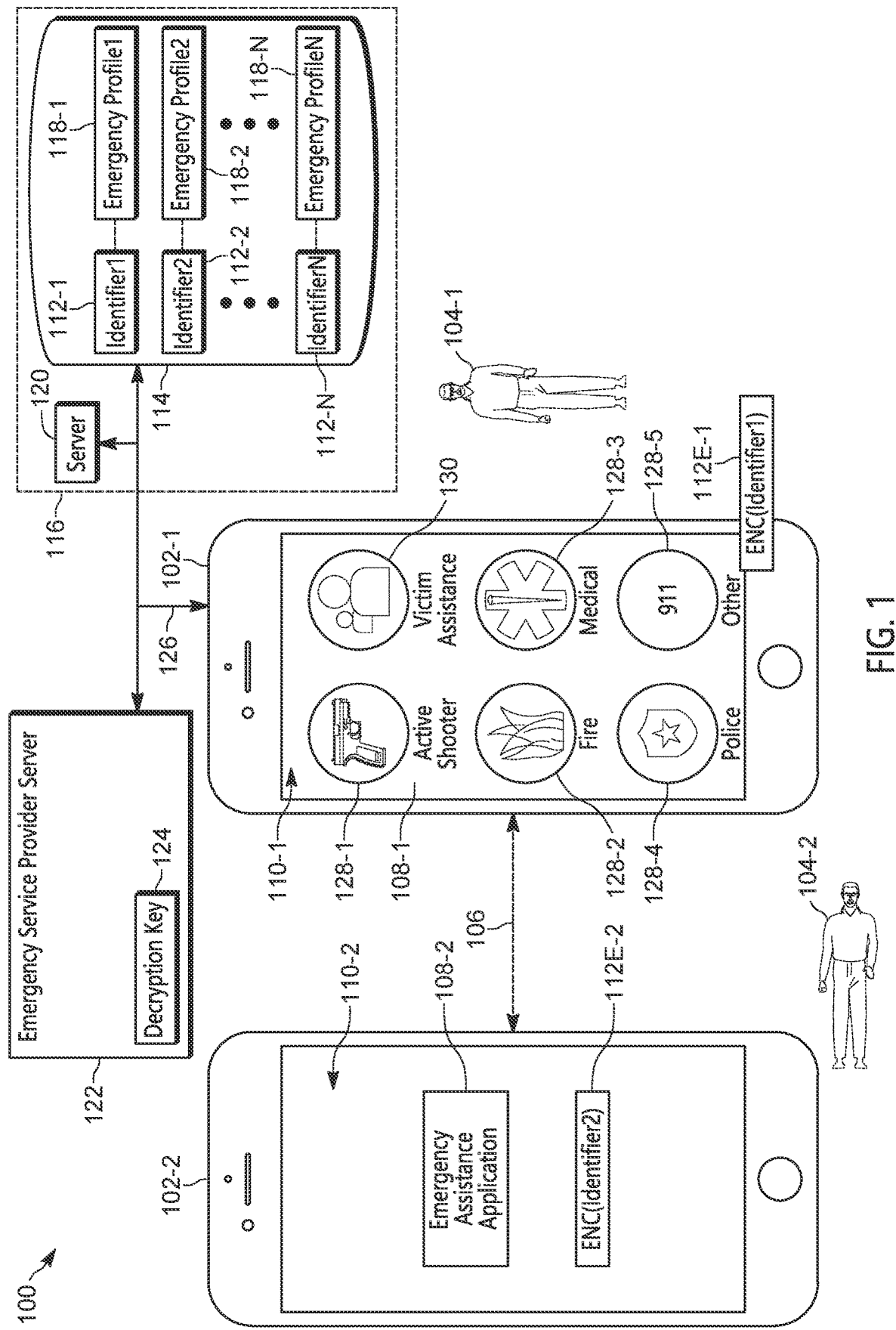
FIG. 1 is a system for emergency personal data access using different communication interface types, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Emergency service applications installed on mobile devices may be used to electronically notify emergency service providers (e.g., at a dispatch center) of an emergency situation and/or public safety incident, for example to dispatch appropriate first responders to the emergency situation and/or public safety incident. Indeed, when such an emergency service application is installed at a mobile device, a user of the mobile device may interact with the emergency service application to both notify an emergency service provider of the emergency situation and/or public safety incident and provide access to an emergency profile of the user that has been previously provisioned at an emergency information system (e.g., which may be operated by an entity that provides the emergency service application). Such an emergency service application generally relies on long-range communication interfaces (e.g., cell phone interfaces) of mobile devices to communicate with emergency service providers, as well as actuation of a button in the emergency service application to initiate such communication. However, in some instances, a user of a mobile device may be incapacitated, and may be unable to actuate such a button and/or use the long-range communication interface at the mobile device to communicate with the emergency service providers. Thus, there exists a need for an improved technical method, device, and system for emergency personal data access using different communication interface types.

An aspect of the present specification provides a method comprising: receiving, at a first mobile device, actuation of a victim assistance button of an emergency assistance application provided at a display screen of the first mobile device, the emergency assistance application associated with a first identifier of a first emergency profile associated with a first user of the first mobile device; receiving, via the first mobile device, from a second mobile device, using a short-range communication interface of the first mobile device, a second identifier of a second emergency profile associated with a second user of the second mobile device, the second identifier being encrypted and decryptable using a common decryption key associated with the emergency assistance application; decrypting, via the first mobile device, the second identifier using the common decryption key; and providing, via the first mobile device, to an emergency service provider server, using a long-range communication interface of the first mobile device, the second identifier, the second identifier enabling the emergency service provider server to retrieve the second emergency profile from a data storage module of an emergency information system at which the first emergency profile of the first user, and the second emergency profile of the second user are registered.

Another aspect of the present specification provides a mobile device comprising: a display screen; a short-range communication interface; a long-range communication interface; a controller; and a computer-readable storage medium having stored thereon program instructions that, when executed by the controller, cause the controller to perform a set of operations comprising: receiving actuation of a victim assistance button of an emergency assistance application provided at the display screen, the emergency assistance application associated with a first identifier of a first emergency profile associated with a first user of the mobile device; receiving, from a second mobile device, using the short-range communication interface, a second identifier of a second emergency profile associated with a second user of the second mobile device, the second identifier being encrypted and decryptable using a common decryption key associated with the emergency assistance application; decrypting the second identifier using the common decryption key; and providing, to an emergency service provider server, using the long-range communication interface, the second identifier, the second identifier enabling the emergency service provider server to retrieve the second emergency profile from a data storage module of an emergency information system at which the first emergency profile of the first user, and the second emergency profile of the second user are registered.

Each of the above-mentioned embodiments will be discussed in more detail below, starting with example system and device architectures of the system in which the embodiments may be practiced, followed by an illustration of processing blocks for achieving an improved technical method, device, and system for emergency personal data access using different communication interface types.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for emergency personal data access using different communication interface types. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks. Specific types of such communication links are described herein.

The system 100 comprises a first mobile device 102-1, and a second mobile device 102-2, interchangeably referred to hereafter, collectively, as the mobile devices 102 and, generically, as a mobile device 102. This convention will be used elsewhere in the present specification. For example, the first mobile device 102-1 is associated with, and/or operated by, a first user 104-1, and the second mobile device 102-2 is associated with, and/or operated by, a second user 104-2, and the users 104-1, 104-2 are interchangeably referred to hereafter as the users 104 and/or a user 104. It is understood that the mobile devices 102 and the users 104 are not shown to scale.

In particular, the mobile devices 102 and the users 104 are generally in proximity to one another. Furthermore, while the first user 104-1 of the first mobile device 102-1 is able to operate the first mobile device 102-1, the second user 104-2 of the second mobile device 102-3 is unable to operate the second mobile device 102-2 as the second the user 104-2 of the second mobile device 102-2 may be incapacitated (e.g., injured or unconscious, or experiencing a medical emergency, and the like, as indicated by the second user 104-2 being depicted as laying down with their eyes closed). Put another way, the second user 104-2 of the second mobile device 102-2 is generally understood to be unable to respond to messages and/or calls, and/or initiate messages and/or calls the like at the second mobile device 102-2, and/or operate and/or initiate applications the second mobile device 102-2 (e.g., due to the second the user 104-2 of the second mobile device 102-2 being incapacitated).

As depicted, however, the mobile devices 102 are enabled to communicatively couple via a wireless short-range communication link 106, such as a near-field communication (NFC) link, a Bluetooth™ communication link, a Bluetooth Low Energy (BLE) low energy link, and the like. For example, as will be described with respect to FIG. 2, the mobile devices 102 generally comprise respective wireless short-range communication interfaces, and may communicate via the wireless short-range communication link 106 using such wireless short-range communication interfaces. The wireless short-range communication link 106 and/or the wireless short-range communication interfaces may be used to provide access, by an emergency service provider, to an emergency profile associated with the second user 104-2 as described herein at least with respect to FIG. 3 and FIG. 4.

Furthermore, it is understood that the wireless short-range communication link 106 is established only when the mobile devices 102 are within a threshold distance from each other, and such a threshold distance may depend on a type of the wireless short-range communication link 106. For example, NFC communication links are generally established only when NFC communication interfaces (e.g., NFC transceivers) are within about 4 cm of each other. However Bluetooth™ communication links are generally established only when Bluetooth™ communication interfaces (e.g., Bluetooth™ transceivers) are within about 10 m of each other, but may be established when Bluetooth™ communication interfaces are up to about 100 m of each other. BLE communication links are generally established only when BLE communication interfaces (e.g., BLE transceivers) are within up to about 1 km of each other. Hence, while NFC communication links and NFC communication interfaces may be used to establish the short-range communication link 106, it is contemplated that Bluetooth™ communication interfaces or BLE communication interfaces may more often be used to establish the short-range communication link 106. Nonetheless, any suitable type of short-range communication interface is within the scope of the present specification. In particular, it is understood that the short-range communication link 106 is established between the mobile devices 102 using respective short-range communication interfaces thereof directly communicating with each other, and without use of intervening communication equipment, such as base stations, routers, and the like.

Furthermore, the term "proximal" as used herein may be understood to be any suitable distance between the mobile devices 102 at which the short-range communication link 106 may be established, and that, as described herein, may depend on a type of technology used to implement the short-range communication link 106. Hence, in some examples, mobile devices 102 being proximal to each other may be understood to include the mobile devices 102 being within about 100 m of each other, or within about 10 m of each other, or within about 10 cm of each other. However, any suitable proximal distance is within the scope of the present specification.

As depicted, the mobile devices 102 have instances of an emergency assistance application 108-1, 108-2 (e.g., emergency assistance applications 108 and/or an emergency assistance application 108) installed therein. As depicted, mobile devices 102 comprise respective display screens 110-1, 110-2 (e.g., the display screens 110 and/or a display screen 110). When an instance of the emergency assistance application 108 is implemented at a mobile device 102, the application 108 may be rendered at a respective display screen 110 (e.g., as depicted in FIG. 1 at a first display screen 110-1 of the first mobile device 102-1). The display screens 110 may comprise touch screens that may be used to actuate items of the emergency assistance application 108 rendered at the display screens 110, as described herein, and/or the mobile devices 102 may comprise any suitable one or more input devices to perform such actuation.

As also depicted, the first mobile device 102-1 has implemented a first instance of the emergency assistance application 108-1 and provided the emergency assistance application 108-1 at the first display screen 110-1 of the first mobile device 102-1.

However, at the second mobile device 102-2, a second instance of the emergency assistance application 108-2 may be operating in a background and not provided at the second display screen 110-2 of the second mobile device 102-2. Alternatively, or in addition, when an instance of the emergency assistance application 108 is installed at a mobile device 102, the emergency assistance application 108 may configure the mobile device 102 to broadcast certain information using a respective short-range communication interface, as described herein, either automatically, or upon receiving a trigger, without the emergency assistance application 108 being otherwise implemented or launched at the mobile device 102.

Hence, while the emergency assistance application 108-2 is generically depicted at the second mobile device 102-2, it is understood that the emergency assistance application 108-2 may not be provided at the display screen 110-2 and/or may be installed at the second mobile device 102-2, but not being currently implemented (e.g., the emergency assistance application 108-2 may not have been launched at the second mobile device 102-2).

Furthermore, the users 104 of the mobile devices 102 are understood to be generally associated with respective identifiers 112-1, 112-2 in the system 100. Such identifiers 112 are stored at a data storage module 114 of an emergency information system 116 in association with respective emergency profiles 118-1, 118-2 of the users 104. Indeed, the respective identifiers 112-1, 112-2 are further understood to be associated with the emergency assistance application 108.

Indeed, as depicted, the data storage module 114 may comprise at least one memory, at least one database, and the like of the emergency information system 116, which may manage emergency profiles of users registered with the emergency information system 116, including, but not limited to, the users 104.

For example, as depicted, the data storage module 114 stores a plurality of identifiers 112-1, 112-2 . . . 112-N (e.g., the identifiers 112 and/or an identifier 112) in respective association with a plurality of emergency profiles 118-1, 118-2 . . . 118-N (e.g., emergency profiles 118 and/or an emergency profile 118), with associations between an identifier 112 and a respective emergency profile 118 indicated via broken lines therebetween.

Figure 5:
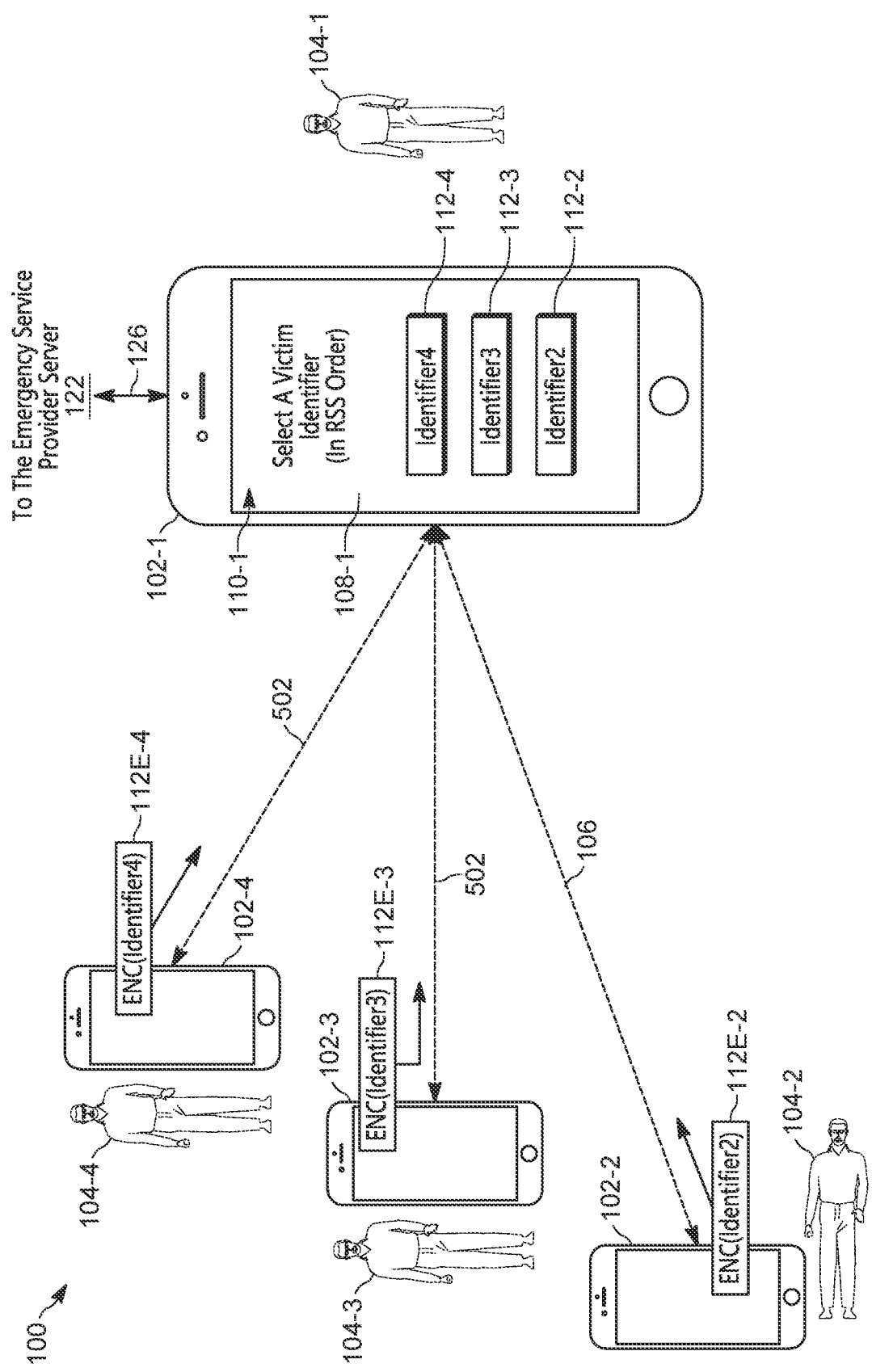
FIG. 5 depicts a portion of the system of FIG. 1 implementing aspects of a method for emergency personal data access using different communication interface types is implemented, in accordance with some examples.

A number "N" of identifiers 112 and respective emergency profiles 118 may correspond to a number of users 104 that have registered with the emergency information system 116. Hence, while in FIG. 1 only two users 104 and respective mobile devices 102 are depicted, the system 100 may comprise any suitable number of mobile devices 102 operated by respective users 104. Such an example is depicted in FIG. 5.

It is further understood that registration of a user 104 at the data storage module 114 and/or the emergency information system 116 may generally occur using instances of the emergency assistance application 108, and/or via any suitable interface with the emergency information system 116, including web-based interfaces such as browsers, and the like.

For example, as depicted, the emergency information system 116 comprises a server 120 that the mobile devices 102 may communicate with to register their respective emergency profiles 118 at the data storage module 114, for example using the emergency assistance application 108.

Furthermore, such registration is understood to generally authorize access pf an emergency service provider server 122 to the emergency information system 116 and/or the data storage module 114 to retrieve emergency profiles 118, or example to better provide emergency services to the users 104. Indeed, the system 100 further comprises the emergency service provider server 122.

The emergency service provider server 122 may comprise a dispatch center server, which dispatches different types of first responders (e.g., police officers, fire fighters, emergency medical technicians, and the like) to emergency situations and/or public safety incidents (e.g., hereafter interchangeably referred to as a public safety incidents), a computer aided dispatch (CAD) server, a 911 call center server, and the like.

As depicted, the emergency service provider server 122 stores, and/or has access to, a common decryption key 124 associated with the emergency assistance application 108. In particular, the mobile devices 102 may respectively store encrypted identifiers 112E-1, 112E-2 (e.g., the encrypted identifiers 112E and/or an encrypted identifier 112E) of their respective associated identifiers 112-1, 112-2. Put another way, a first encrypted identifier 112E-1 may comprise the first identifier 112-1, but encrypted using an encryption key complementary to the common decryption key 124, such that the first encrypted identifier 112E-1 may be decrypted using the common decryption key 124 to obtain the first identifier 112-1. Similarly, a second encrypted identifier 112E-2 may comprise the second identifier 112-2, but encrypted using the encryption key complementary to the common decryption key 124, such that the second encrypted identifier 112E-2 may be decrypted using the common decryption key 124 to obtain the second identifier 112-2. While for simplicity, the encrypted identifiers 112E are depicted at or on respective mobile devices 102, it is understood that the encrypted identifiers 112E are stored at respective memories of the mobile devices 102, as described with respect to FIG. 2.

While not depicted, the mobile devices 102 may alternatively store an unencrypted version of a respective identifier 112.

As depicted, at least the first mobile device 102-1 may communicatively couple with the emergency service provider server 122 (e.g., and the server 120 and/or the data storage module 114) via a long-range communication link 126 that may be at least partially wireless. For clarity, and to distinguish between the communication links 106, 126, the wireless short-range communication link 106 is depicted as a broken line and the long-range communication link 126 is depicted as a solid line.

While for simplicity, a similar long-range communication link between the second mobile device 102-2 and the servers 120, 122 and the data storage module 114 is not depicted, the second mobile device 102-2 may also communicatively couple with the emergency service provider server 122 (e.g., and the server 120 and/or the data storage module 114) via a respective long-range communication link.

The long-range communication link 126 may comprise any suitable wireless long-range communication link, such as a radio link, a cell phone link, and the like which may, for example, use base stations to communicate with other components of the system 100. In particular, as will be described with respect to FIG. 2, the mobile devices 102 generally comprise respective wireless long-range communication interfaces (e.g., long-range transceivers), and may communicate via the long-range communication link 126 using such wireless long-range communication interfaces. The long-range communication link 126 may be used to communicate with the servers 120, 122 and/or the data storage module 114.

The identifiers 112 generally comprise any suitable alphanumeric identifiers and may include, but are not limited to, telephone numbers associated with respective users 104 (e.g., such as respective telephone numbers of the mobile devices 102), names of the respective users 104, and the like. Put another way, the identifiers 112 may comprise alphanumeric identifiers that may convey specific types of information, such as telephone numbers and/or names, however the identifiers 112 may comprise any other types of alphanumeric identifiers including, but not limited to, random strings of alphanumeric characters, and the like. It is further understood, however, that the identifiers 112 are generally unique within the system 100, such that no two identifiers 112 are the same.

Indeed, the identifiers 112 may be provided in two or more parts, such as a random string of alphanumeric characters combined with a telephone number and/or a name.

Furthermore, the identifiers 112 need not be only alphanumeric. For example, an identifier 112 may include an image of a respective user 104.

Hence, while the identifiers 112 are represented in FIG. 1 by text "Identifier1", "Identifier2", "IdentifierN", the identifiers 112 may comprise any suitable alphanumeric identifiers.

The emergency profiles 118 may comprise any suitable information associated with a respective user 104 that may be useful in an emergency situation. For example, an emergency profile 118 may include, but is not limited to, any suitable combination of medical records of a respective user 104, medication taken by a respective user 104, a medical condition of a respective user 104, and the like, and may include other types of information that is not medically related, such an address of a respective user 104, an identifier (e.g., such as a license plate) of a vehicle of a respective user 104, an image of a respective user 104, amongst other possibilities.

The emergency profiles 118 may be populated during a registration process and/or such a registration process may include a user 104 authorizing the emergency information system 116 (e.g., the server 120) to obtain medical information from a medical services provider system and/or server (not depicted), and/or any other suitable system and/or server that may store emergency-related information associated with a user 104.

Attention is next directed to the first instance of the emergency assistance application 108-1 rendered at the display screen 110-1 of the first mobile device 102-1.

As depicted, the emergency assistance application 108-1 comprises a plurality of emergency assistance buttons 128-1, 128-2, 128-3, 128-4, 128-5 (e.g., the buttons 128 and/or a button 128). In particular, the buttons 128-1, 128-2, 128-3, 128-4, 128-5 are respectively associated with active shooter incidents, fire incidents, medical incidents, more general police incidents, and other incidents.

Hence, when the buttons 128-1, 128-2, 128-3, 128-4, 128-5 are respectively actuated (e.g., by the first user 104-1), the first mobile device 102-1 provides, to the emergency service provider server 122, via the long-range communication link 126, a respective indication of a type of public safety incident and, in particular, an indication of an active shooter incident, a fire incident, a medical incidents, a more general police incidents, or a generic public safety incident (e.g., when the user is unable to determine a type of an emergency situation and/or public safety incident and wants to report a general emergency situation and/or public safety incident to a 911 call center, and the like).

The indication of the type of public safety incident of emergency or public safety incident indicated by an actuated button 128 may be provided to the emergency service provider server 122, by the first mobile device 102-1, with the first encrypted identifier 112E-1 (or the first identifier 112-1) and, optionally, a location of the first mobile device 102-1 (e.g., the mobile devices 102 may include respective location determining devices, such as Global Positioning System (GPS) devices). When a location of the first mobile device 102-1 is not provided, the emergency service provider server 122 may determine a location of the first mobile device 102-1 using any suitable network-based location determining process.

The emergency service provider server 122 receives the first encrypted identifier 112E-1 and decrypts the first encrypted identifier 112E-1 using the common decryption key 124 to obtain the first identifier 112-1; or, when the first identifier 112-1 is received, such decryption does not occur and/or is optional.

Having obtained the first identifier 112-1, the emergency service provider server 122 may request the associated first emergency profile 118-1 from the emergency information system 116 using the first identifier 112-1. The emergency service provider server 122 receives the first emergency profile 118-1 and may process the first emergency profile 118-1 to determine if any specific type of first responder should be dispatched to the location of the first mobile device 102-1 to attend to the first user 104-1. For example, when the medical incident button 128-3 is actuated, the first emergency profile 118-1 may indicate that the first user 104-1 has a heart condition, and an emergency medical technician may be dispatched that has expertise in heart conditions, and the like. Alternatively, or in addition, the first emergency profile 118-1 may be provided to a communication device (not depicted) of a first responder dispatched to the location of the first mobile device 102-1.

As depicted, the emergency assistance application 108-1 further includes a victim assistance button 130, which, when actuated, generally causes the emergency service provider server 122 to obtain the second emergency profile 118-2 associated with the second user 104-2 (e.g., and not the first emergency profile 118-1 associated with the first user 104-1), as is next described.

For example, the first user 104-1 may notice that the second user 104-2 is incapacitated and actuate the victim assistance button 130, which causes the first mobile device 102-1 to receive, from the second mobile device 102-2, the second encrypted identifier 112E-2 via the short-range communication link 106. In some examples, the first mobile device 102-1, in response to the victim assistance button 130 being actuated, may trigger the second mobile device 102-2 to broadcast the second encrypted identifier 112E-2 via the short-range communication link 106, for example by broadcasting such a trigger using a respective short-range communication interface. In other examples, the second mobile device 102-2 may generally be broadcasting the second encrypted identifier 112E-2 via the short-range communication link 106 (e.g., without receiving a trigger) and the first mobile device 102-1 may search for the second encrypted identifier 112E-2 via the short-range communication link 106 and/or a respective short-range communication interface.

The first mobile device 102-1, having received the second encrypted identifier 112E-2, decrypts the second encrypted identifier 112E-2 using the common decryption key 124, which may already be stored at the first mobile device 102-1, or the first mobile device 102-1 may request the common decryption key 124 from the emergency service provider server 122 via the long-range communication link 126, for example when the victim assistance button 130 is actuated. Indeed, when the common decryption key 124 is requested from the emergency service provider server 122, receipt of the common decryption key 124 at the first mobile device 102-1 may cause the first mobile device 102-1 to perform the aforementioned triggering of the second mobile device 102-2 to broadcast the second encrypted identifier 112E-2.

The second identifier 112-2 (e.g., as decrypted) may optionally be rendered at the display screen 110-1, for example in the first instance of the emergency assistance application 108-1, such that the first user 104-1 may review the second identifier 112-2 (e.g., as decrypted) and confirm the second identifier 112-2, for example to ensure that the second identifier 112-2 is in a given format that is compatible with the emergency assistance application 108. Such a confirmation may occur by way of the second identifier 112-2, and/or an indication thereof, being selected at the display screen 110-1.

Alternatively, or in addition, the first mobile device 102-1 and/or the first instance of the emergency assistance application 108-1 may process the second identifier 112-2 (e.g., as decrypted) to confirm that the second identifier 112-2 is in a given format that is compatible with the emergency assistance application 108.

In this manner, in the event that other types of identifiers that are not identifiers 112 associated with the emergency assistance application 108 are received (e.g., via a short-range communication interface at the first mobile device 102-1), for example from other communication devices and/or mobile devices not registered with the emergency information system 116, the first user 104-1 and/or the first mobile device 102-1 may decide not to proceed with sending a received identifier the emergency service provider server 122.

Alternatively, when a plurality of identifiers are received, and rendered at the display screen 110-1, the first user 104-1 may select the second identifier 112-2, and/or an indication thereof, from the plurality of identifiers and/or respective indications thereof.

Having obtained the second identifier 112-2 via the short-range communication link 106, the first mobile device 102-1 provides the second identifier 112-2 to the emergency service provider server 122 via the long-range communication link 126. A location of the first mobile device 102-1 (e.g., which is understood to be the same or similar to the location of the second mobile device 102-2) may also be provided to the emergency service provider server 122, and/or the emergency service provider server 122 may determine the location of the first mobile device 102-1 using network-based location determining techniques.

Alternatively, or in addition, when the second mobile device 102-2 provides the second encrypted identifier 112E-2 via the short-range communication link 106, the second mobile device 102-2 may also provide a respective location of the second mobile device 102-2 with the second encrypted identifier 112E-2 and the first mobile device 102-1 may provide the respective location of the second mobile device 102-2 to the emergency service provider server 122 with the second identifier 112-2.

The emergency service provider server 122 may use the second identifier 112-2 to obtain the second emergency profile 118-2 from the emergency information system 116 and/or the data storage module 114, and dispatch first responders accordingly to the location of the first mobile device 102-1 and/or the second mobile device 102-2.

In this manner, the second identifier 112-2 is obtained in an encrypted form via the short-range communication link 106, which may otherwise be insecure. The decrypting of the second identifier 112-2 at the first mobile device 102-1 enables confirmation of the second identifier 112-2 at the first mobile device 102-1.

Furthermore, the second identifier 112-2 is provided to the emergency service provider server 122 so that the second emergency profile 118-2 may be obtained without the second mobile device 102-2 being operated by the second user 104-2.

Furthermore, communication between the first mobile device 102-1 and the emergency service provider server 122 may occur securely and/or in an encrypted manner (e.g., using Hypertext Transfer Protocol Secure (HTTPS) protocols, and the like) to ensure that the second identifier 112-2 is not transmitted in the clear.

Figure 2:
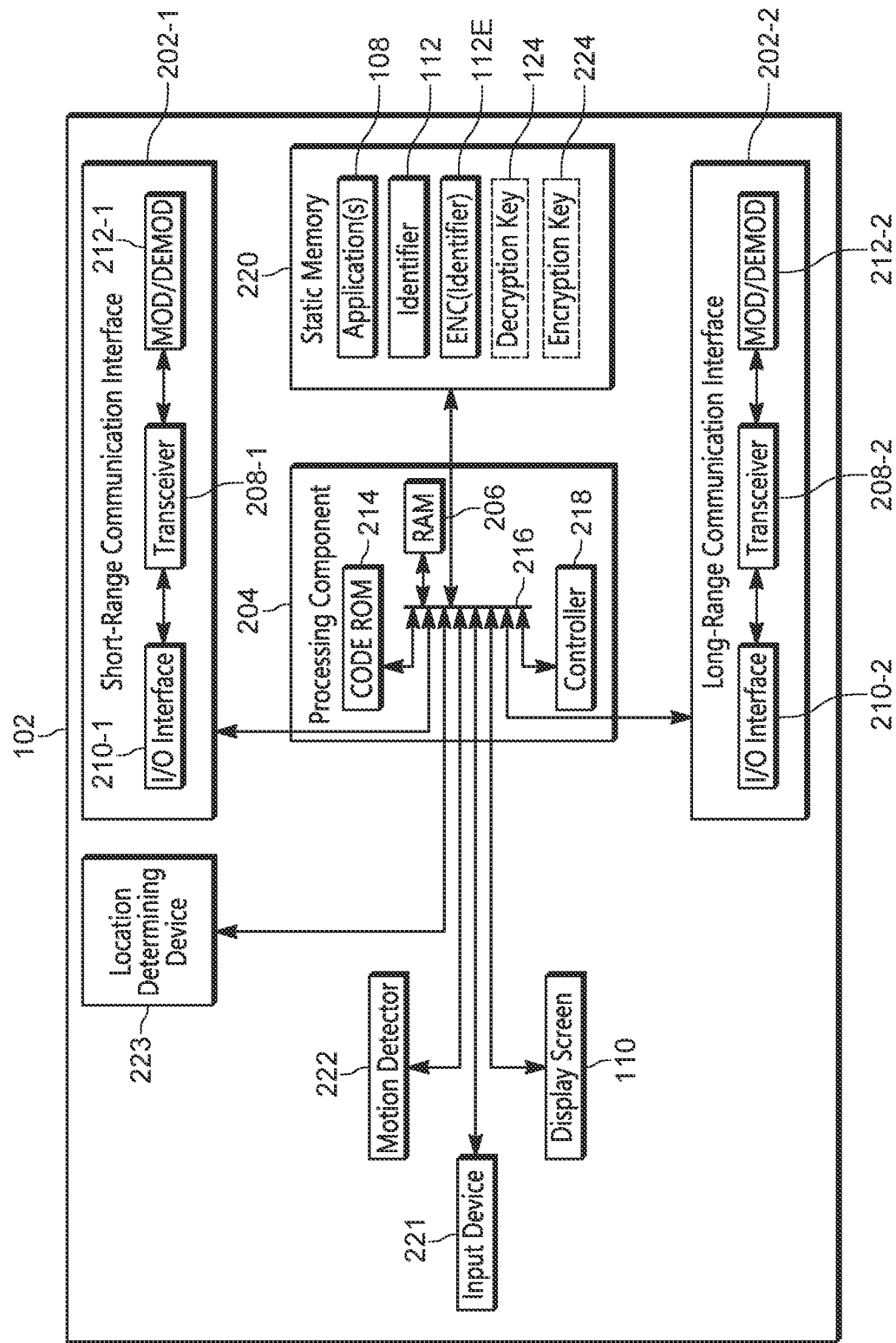
FIG. 2 is a device diagram showing a device structure of a device for emergency personal data access using different communication interface types, in accordance with some examples.

Attention is next directed to FIG. 2, which depicts a schematic block diagram of an example of an example mobile device 102, which may comprise the first mobile device 102-1 or the second mobile device 102-2, though both of the first mobile device 102-1 or the second mobile device 102-2 may have the structure depicted in FIG. 2.

As depicted, the mobile device 102 comprises: a short-range communication interface 202-1, a long-range communication interface 202-2 (e.g., the communication interfaces 202 and/or a communication interface 202), a processing component 204, a Random-Access Memory (RAM) 206, a short range transceiver 208-1 (e.g., a component of the short-range communication interface 202-1), a long-range transceiver 208-2 (e.g., a component of the long-range communication interface 202-1), one or more wired and/or wireless input/output (I/O) interfaces 210-1, 210-2 (e.g., respective components of the communication interfaces 202), one or more combined modulators/demodulators 212-1, 212-2 (e.g., respective components of the communication interfaces 202), a code Read Only Memory (ROM) 214, a common data and address bus 216, a controller 218, and a static memory 220 storing the application 108.

The transceivers 208-1, 208-2 are interchangeably referred to herein as the transceivers 208 and/or a transceiver 208. The (I/O) interfaces 210-1, 210-2 are interchangeably referred to herein as the I/O interfaces 210 and/or an IO interface 210. The modulators/demodulators 212-1, 212-2 are interchangeably referred to herein as the modulators/demodulators 212 and/or a modulator/demodulator 212.

Furthermore, while the memories 206, 214 are depicted as having a particular structure and/or configuration, (e.g., separate RAM 206 and ROM 214), memory of the mobile device 102 may have any suitable structure and/or configuration.

The mobile device 102 further comprises a display screen 110, an input device 221 (which may comprise a touch screen of the display screen 110), a motion detector 222, such as an accelerometer, and the like, and a location determining device 223, such as a GPS device, and the like.

As shown in FIG. 2, the mobile device 102 includes the communication interfaces 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interfaces 202 may be separate or combined, and/or the IO interfaces 210 and/or the modulators/demodulators 212 may be separate or combined. The input/output (I/O) interfaces 210 generally include wireless interfaces, but may optionally include wired interfaces.

In particular, the short-range communication interface 202-1 includes one or more short range transceiver 208-1 for communicating via the short-range communication link 106. Hence, the one or more short range transceivers 208-1 may comprise one or more of an NFC transceiver, a Bluetooth™ transceiver, a BLE™ transceiver, and the like.

The long-range communication interface 202-2 includes one or more long range transceiver 208-2 for communicating via the long-range communication link 126. Hence, the one or more long range transceivers 208-2 may comprise one or more of a Wi-Fi transceiver, for example operating in accordance with an IEEE 802.11 standard (e.g., 802.11a, 802.11b, 802.11g), an LTE (Long-Term Evolution) transceiver and/or other types of GSM (Global System for Mobile communications) and/or 3GPP (3rd Generation Partnership Project) transceiver, a 5G transceiver (e.g., for communicating via a network architecture compliant with, for example, the 3GPP TS 23 specification series and/or a new radio (NR) air interface compliant with the 3GPP TS 38 specification series) standard), a Worldwide Interoperability for Microwave Access (WiMAX) transceiver, for example operating in accordance with an IEEE 802.16 standard, and/or another similar type of long range wireless transceiver.

In some examples, the mobile device 102 may comprise a first responder communication device (e.g., and a respective user 104 may be a first responder). In these examples, the long-range communication transceiver 208-2 may comprise one or more of a digital mobile radio (DMR) transceiver, digital mobile radio (DMR) transceiver, and a terrestrial trunked radio (TETRA) transceiver. Such DMR, P25 and TETRA transceivers may be particular to first responder communication devices and/or mobile devices.

The communication interfaces 202 may further optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the mobile device 102 is not a generic controller and/or a generic device, but a device specifically configured to implement functionality for emergency personal data access using different communication interface types. For example, in some examples, the mobile device 102 and/or the controller 218 specifically comprises a computer executable engine configured to implement functionality for emergency personal data access using different communication interface types.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the mobile device 102 as described herein are maintained, persistently, at the memory 220 and used by the controller 218, which makes appropriate utilization of volatile storage during the execution of such programming instructions.

Figure 3:
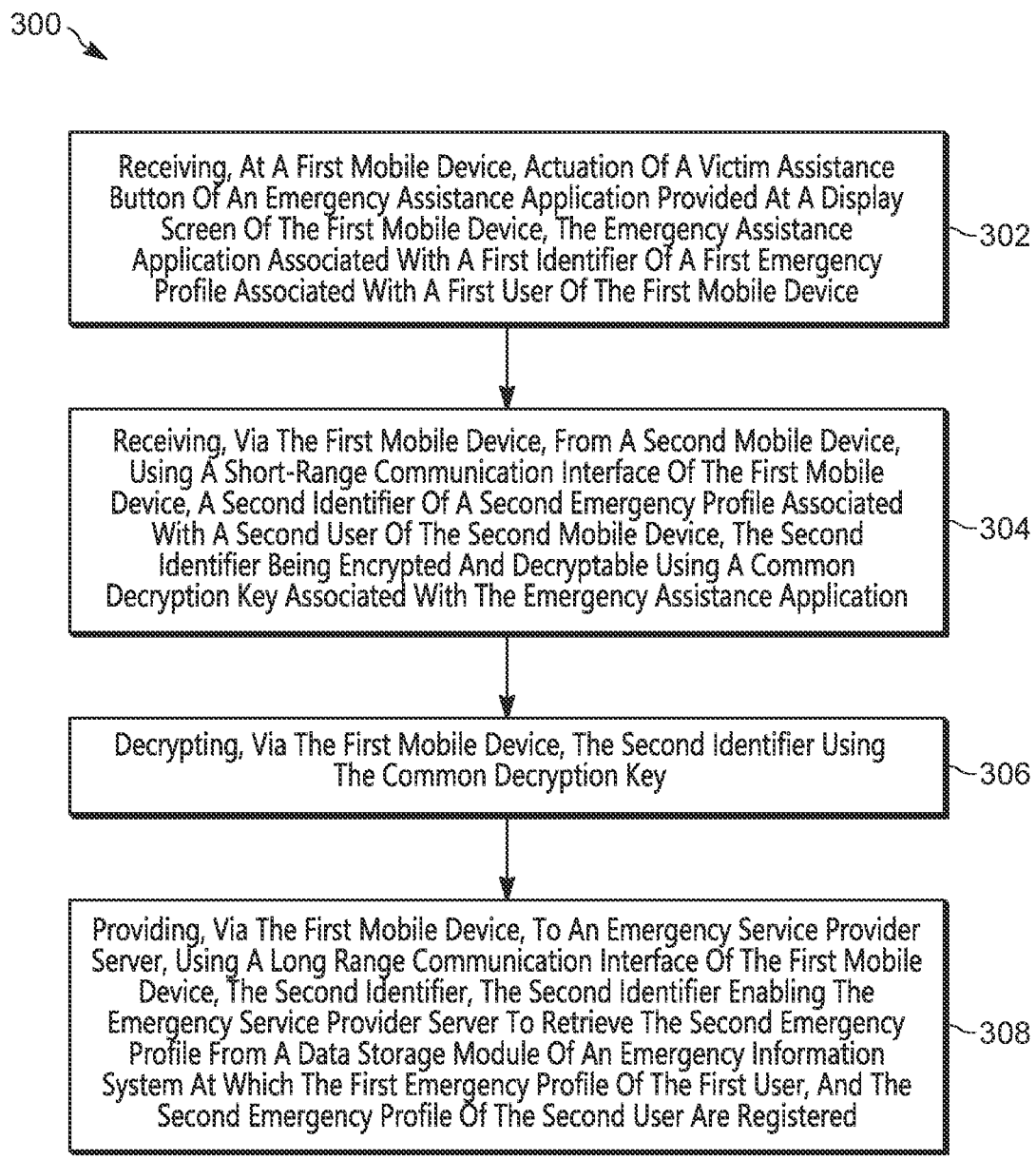
FIG. 3 is a flowchart of a method for emergency personal data access using different communication interface types, in accordance with some examples.

Indeed, the memory 220 may comprise a computer-readable storage medium having stored thereon program instructions that, when executed by the controller 218, cause the controller 218 to perform a set of operations to implement functionality for emergency personal data access using different communication interface types, including but not limited to, the blocks of the methods set forth in FIG. 3.

Put another way, the memory 220 stores instructions corresponding to the application 108 that, when executed by the controller 218, enables the controller 218 to implement functionality for emergency personal data access using different communication interface types, including but not limited to, the blocks of the methods set forth in FIG. 3.

As depicted, the memory 220 further stores a respective identifier 112 and a respective encrypted identifier 112E, though, in some examples, only the first identifier 112 or the first encrypted identifier 112E may be stored.

As depicted, the memory 220 optionally stored the common decryption key 124 and/or a complementary encryption key 224. Hence, when the respective identifier 112 is stored, but not the respective encrypted identifier 112E, the respective encrypted identifier 112E may be generated by the mobile device 102 using the complementary encryption key 224 to encrypt the respective identifier 112.

Similarly, when the respective encrypted identifier 112E is stored, but not the respective identifier 112, the respective identifier 112 may be generated by the mobile device 102 using the common decryption key 124 to decrypt the respective encrypted identifier 112E.

In some examples, neither the common decryption key 124, nor the complementary encryption key 224 are stored at the memory 220, though the common decryption key 124 may later be obtained from the emergency service provider server 122, as described herein.

Indeed, it is generally understood that the common decryption key 124 is common to the mobile devices 102, such that the encrypted identifiers 112E of the system 100 may be decrypted using the common decryption key 124 to obtain respective identifiers 112.

While details of other components of the system 100 are not depicted, such as the servers 120, 122, the servers 120, 122 may have a structure similar to that of the mobile device 102, but adapted for respective functionality of the servers 120, 122.

Attention is now directed to FIG. 3, which depicts a flowchart representative of a method 300 for emergency personal data access using different communication interface types. The operations of the method 300 of FIG. 3 correspond to machine readable instructions that are executed by the first mobile device 102-1, and specifically the controller 218 of the first mobile device 102-1. In the illustrated example, the instructions represented by the blocks of FIG. 3 are stored at the memory 220 for example, as the application 108 (and/or the first instance of the application 108-1). The method 300 of FIG. 3 is one way in which the controller 218 and/or the first mobile device 102-1 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Hereafter, communications between the mobile devices 102 are understood to occur via respective short-range communication interfaces 202-1 and/or the short-range communication link 106, and communications between the first mobile device 102-1 and the emergency service provider server 122 are understood to occur via the respective long-range communication interface 202-2 of the first mobile device 102-1 and/or the long-range communication link 126.

At a block 302, the controller 218, and/or the first mobile device 102-1, receives actuation of the victim assistance button 130 of the emergency assistance application 108-1 provided at the display screen 110-1 of the first mobile device 102-1, the emergency assistance application 108-1 associated with the first identifier 112-1 of the first emergency profile 118-1 associated with the first user 104-1 of the first mobile device 102-1.

At a block 304, the controller 218, and/or the first mobile device 102-1, receives, from the second mobile device 102-2, using the respect short-range communication interface 202-1 of the first mobile device 102-1, the second identifier 112-2 of the second emergency profile 118-2 associated with a second user 104-2 of the second mobile device 102-2, the second identifier 112-2 being encrypted (e.g., as the second encrypted identifier 112E-2) and decryptable using the common decryption key 124 associated with the emergency assistance application 108.

At a block 306, the controller 218, and/or the first mobile device 102-1, decrypts the second identifier 112-2 encrypted (e.g., decrypts the second encrypted identifier 112E-2) using the common decryption key 124.

At a block 308, the controller 218, and/or the first mobile device 102-1, provides, to the emergency service provider server 122, using the respective long-range communication interface 202-2 of the first mobile device 102-1, the second identifier 112-2, the second identifier 112-2 enabling the emergency service provider server 122 to retrieve the second emergency profile 118-2 from the data storage module 114 of the emergency information system 116 at which the first emergency profile 118-1 of the first user 104-1, and the second emergency profile 118-2 of the second user 104-2 are registered.

The method 300 may include other features.

For example, the method 300 may further comprise, the controller 218, and/or the first mobile device 102-1: rendering, at the display screen 110-1 of the first mobile device 102-1, the second identifier 112-2 as decrypted; receiving, within the emergency assistance application 108, a selection of the second identifier 112-2; and providing (e.g., at the block 306), to the emergency service provider server 122, the second identifier 112-2 in response to receiving the selection. Such a selection of the second identifier 112-2 may occur via the first user 104-1 interacting with a touch screen of the first mobile device 102-1.

In other examples, the method 300 may further comprise, the controller 218, and/or the first mobile device 102-1, in response to receiving the actuation (e.g., at the block 302): requesting, from the emergency service provider server 122, the common decryption key 124; and, receiving, from the emergency service provider server 122, the common decryption key 124. Such a request may occur at, or before, or after, any suitable block of the method 300.

In other examples, the method 300 may further comprise, the controller 218, and/or the first mobile device 102-1: retrieving the common decryption key 124 from the memory of the first mobile device 102-1. Such a retrieval may at, or before, or after, any suitable block of the method 300.

In some examples, the second mobile device 102-2 may be broadcasting the second identifier 112-2 via a respective short-range communication interface 202-1, and the method 300 may further comprise, the controller 218, and/or the first mobile device 102-1, in response to receiving the actuation (e.g., at the block 302): searching, using the short-range communication interface 202-1, for the second identifier 112-2 as broadcast by the second mobile device 102-2. As used herein, the term broadcast may be understood to include the transmitting information, such as the second identifier 112-2 via a respective short-range communication interface 202-1, before establishing a communication link with a device receiving the information. For example, once the first mobile device 102-1 receives the, the mobile devices 102 may communicate using a suitable protocol (e.g., an NFC protocol, a Bluetooth™ protocol, a BLE protocol, and the like) to establish the short-range communication link 106.

In other examples, the method 300 may further comprise, the controller 218, and/or the first mobile device 102-1, in response to receiving the actuation (e.g., at the block 302): broadcasting, using the short-range communication interface 202-1, a trigger to cause the second mobile device 102-2 to broadcast the second identifier 112-2 of the second emergency profile 118-2, the second identifier 112-2 received in response to broadcasting the trigger.

In other examples, the method 300 may further comprise, the controller 218, and/or the first mobile device 102-1, in response to receiving the actuation (e.g., at the block 302): requesting, via the first mobile device 102-1 (e.g., using the respective long-range communication interface 202-2), from the emergency service provider server 122, the common decryption key 124; receiving, from the emergency service provider server 122, the common decryption key 124; and in response to receiving the common decryption key 124, broadcasting, using the short-range communication interface 202-1, a trigger to cause other mobile devices proximal the first mobile device 102-1, including the second mobile device 102-2, to broadcast respective identifiers of respective emergency profiles, the second identifier 112-2 received in response to broadcasting the trigger.

Figure 4:
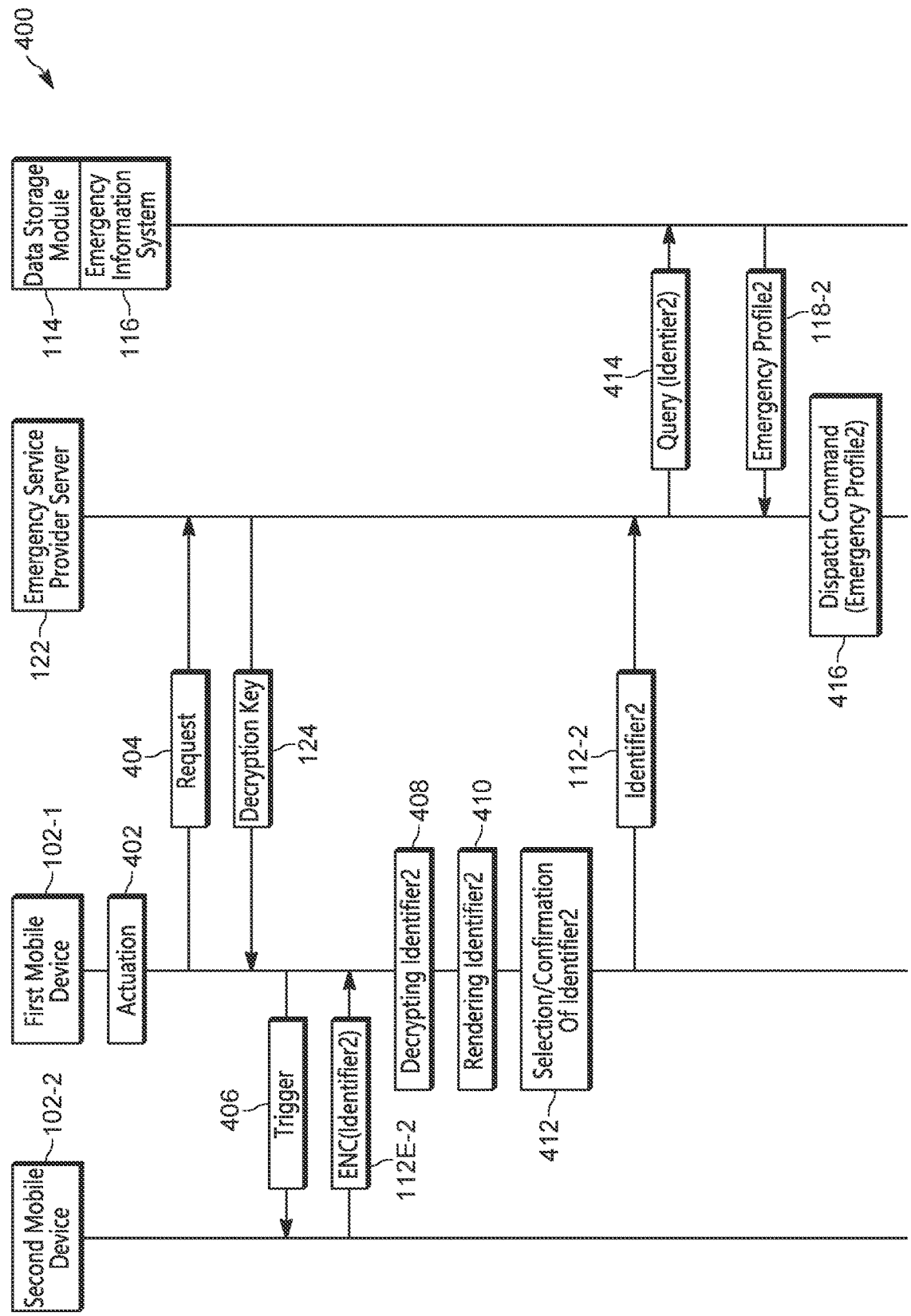
FIG. 4 depicts a signal diagram showing components of the system of FIG. 1 implementing a method for emergency personal data access using different communication interface types is not implemented, in accordance with some examples.

Attention is next directed to FIG. 4 which depicts a signal diagram 400 showing communication between the components of the system 100 during execution of an example of the method 300. While not all components of the system 100 are depicted in FIG. 4, they are nonetheless understood to be present.

It is furthermore understood that the example of FIG. 4 is not unduly limiting and that variations of the method 300 are within the scope of the present specification.

As depicted, actuation 402 of the victim assistance button 130 occurs at the first mobile device 102-1 (e.g., at the block 302 of the method 300), and, in response, the first mobile device 102-1 transmits a request 404 for the common decryption key 124 to the emergency service provider server 122, which responds by transmitting the common decryption key 124 to the first mobile device 102-1. Such communication may occur securely and/or in an encrypted manner (e.g., using HTTPS protocols, and the like) to ensure that the common decryption key 124 is not transmitted in the clear.

The first mobile device 102-1 receives the common decryption key 124 and responsively broadcasts a trigger 406 on the respective short-range communication interface 202-1. The trigger 406 may comprise a request that encrypted identifiers 112E be broadcast by mobile devices 102 receiving the trigger 406 using respective short-range communication interfaces 202-1. The second mobile device 102-2 receives the trigger 406 and responsively transmits the second encrypted identifier 112E-2 via the respective short-range communication interface 202-1 (e.g., via the short-range communication link 106).

While not depicted, the second mobile device 102-2 may optionally transmit a location of the second mobile device 102-2 (e.g., as determined using the respective location determining device 223), with the second encrypted identifier 112E-2. The respective location may also be encrypted when the second mobile device 102-2 stores the encryption key 224.

The first mobile device 102-1 receives (e.g., at the block 304 of the method 300) the second encrypted identifier 112E-2 and decrypts 408 the second encrypted identifier 112E-2 using the common decryption key 124 to obtain the second identifier 112-2. When the location of the second mobile device 102-2 is received and encrypted, the first mobile device 102-1 may also decrypt the location of the second mobile device 102-2 using the common decryption key 124 to obtain the unencrypted location of the second mobile device 102-2.

The first mobile device 102-1 renders 410 the second identifier 112-2 at the first display screen 110-1 (with or without the location of the second mobile device 102-2), and receives a selection and/or confirmation 412 of a respective indicator of the the second identifier 112-2. For example, the first user 104-1 may select and/or confirm the second identifier 112-2 using a touch screen of the first display screen 110-1. An example of such a selection, as well as respective indicator, is described below with respect to FIG. 6.

In response to the selection and/or confirmation 412 of the second identifier 112-2, the first mobile device 102-1 transmits the second identifier 112-2 to the emergency service provider server 122 using, for example a secure connection and/or protocol over the long-range communication link 126. While not depicted, the first mobile device 102-1 may optionally transmit a location of the first mobile device 102-1 (e.g., as determined using the respective location determining device 223), or the location of the second mobile device 102-2, with the second identifier 112-2. Indeed, as the first mobile device 102-1 and the second mobile device 102-2 are understood to be proximal, their respective locations are understood to be about the same and/or similar.

The emergency service provider server 122 receives the second identifier 112-2 and uses the second identifier 112-2 to query 414 the data storage module 114 and/or the emergency information system 116, for example to request an emergency profile 118 associated with the second identifier 112-2 stored at the data storage module 114. The data storage module 114 and/or the emergency information system 116 may perform a database lookup, and the like of the data storage module 114 using the second identifier 112-2 to retrieve the second emergency profile 118-2. The data storage module 114 and/or the emergency information system 116 responds to the query 414 by providing the second emergency profile 118-2 to the emergency service provider server 122. The emergency service provider server 122 may generate and transmit a dispatch command 416 to a respective communication device of a first responder to dispatch the first responder to a location of the first mobile device 102-1 and/or the second mobile device 102-2 (e.g., which may be received with the identifier 112-2 and/or determined in any other suitable network-based location determining process).

The method 300 may include yet further features.

For example, the method 300 may further comprise, the controller 218, and/or the first mobile device 102-1: receiving, using the short-range communication interface 202-1, respective identifiers of respective emergency profiles of other mobile devices proximal the first mobile device 102-1, including the second mobile device 102-2; in response to receiving the actuation (e.g., at the block 302), providing, at the display screen 110-1, within the emergency assistance application 108, respective indicators of the respective identifiers, in an order of respective received signal strength (RSS); receiving, within the emergency assistance application 108, a selection of a respective indicator of the second identifier 112-2 from among the respective indicators; and providing (e.g., at the block 308), to the emergency service provider server 122, the second identifier 112-2 in response to receiving the selection.

Figure 6:
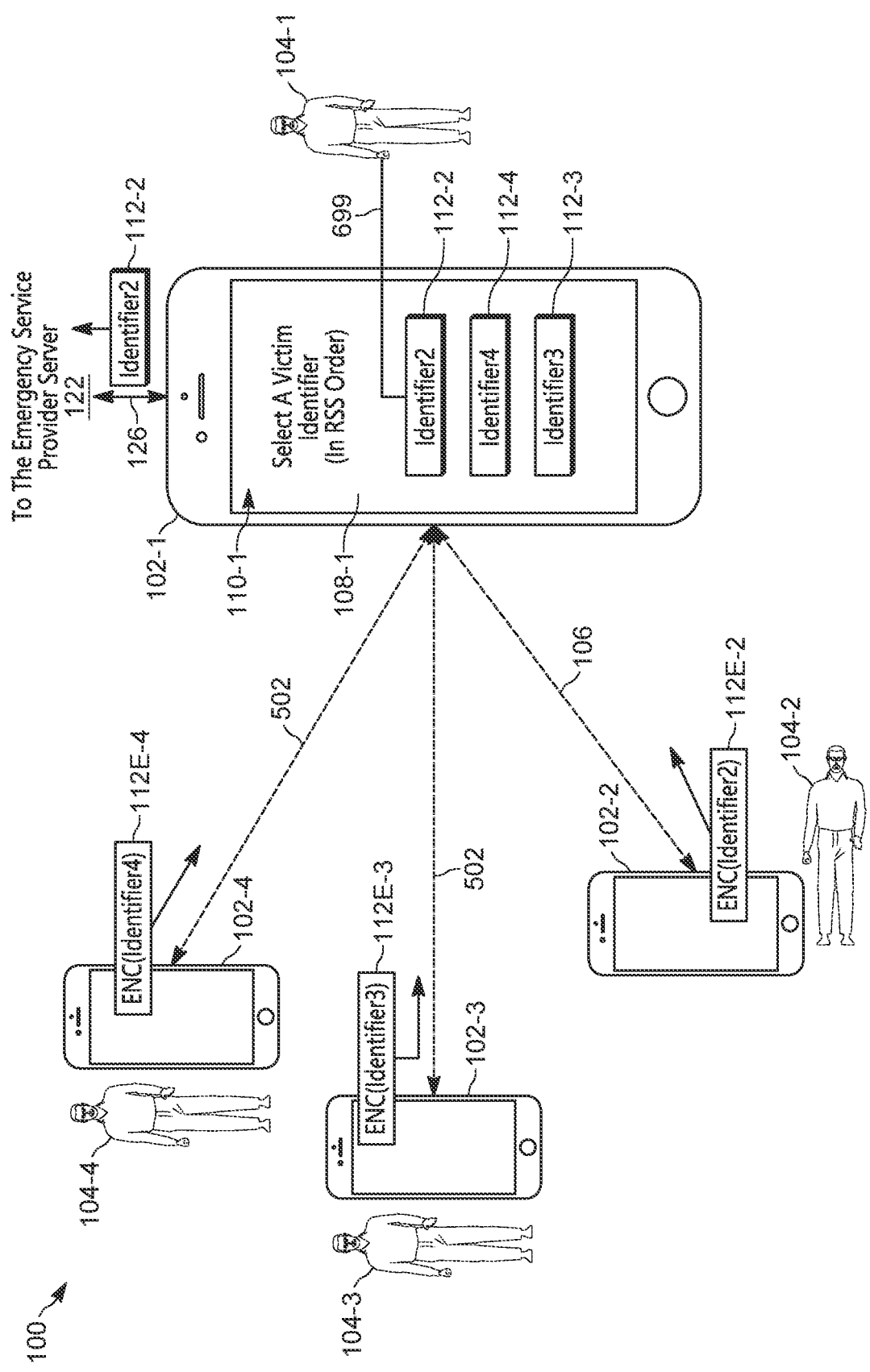
FIG. 6 depicts a portion of the system of FIG. 1 implementing further aspects of a method for emergency personal data access using different communication interface types is implemented, in accordance with some examples.

For example attention is next directed to FIG. 5 and FIG. 6 which depicts a portion of the system 100, with like components of the system 100 depicted in FIG. 5 and FIG. 6 having like numbers as depicted in FIG. 1. While not all the components of the system 100 are depicted in FIG. 5 and FIG. 6, they are nonetheless understood to be present. For example, FIG. 5 and FIG. 6 depict the first mobile device 102-1, the second mobile device 102-2, the short-range communication link 106, and the long-range communication link 126, but not the emergency service provider server 122 or the emergency information system 116, which are nonetheless understood to be present.

Attention is first directed to FIG. 5, which depicts the mobile devices 102-1, 102-2 and the associated users 104-1, 104-2, and third and fourth (e.g., additional) mobile devices 102-3, 102-4 respectively storing a third encrypted identifier 112E-3 and a fourth encrypted identifier 112E-4, the additional mobile devices 102-3, 102-4 operated by respective users 104-3, 104-4. It is understood that the encrypted identifiers 112E-3, 112E-4 may be decrypted using the common decryption key 124 to obtain respective identifiers 112-3, 112-4 associated with respective emergency profiles 118.

Furthermore, as depicted, the first mobile device 102-1 is communicatively coupled to the second mobile device 102-2 via the short-range communication link 106, and the first mobile device 102-1 is further communicatively coupled to the additional mobile devices 102-3, 102-4 via respective short-range communication links 502 established in a manner similar to the short-range communication link 106.

As such, the first mobile device 102-1 receives (e.g., at the block 304 of the method 300) not only the second encrypted identifier 112E-2, but also the encrypted identifiers 112E-3, 112E-4 (e.g., via the respective short-range communication links 502), and decrypts (e.g., at the block 306 of the method 300) them using the common decryption key 124.

The first mobile device 102-1 is further understood to be generally configured to measure and/or determine respective received signal strength (RSS) of the short-range communication links 106, 502. Hence, for example, as the fourth mobile device 102-4 is closest to the first mobile device 102-1, the RSS of the respective short-range communication link 502 is understood to be higher than the other short-range communication links 106, 502.

Similarly, as the third mobile device 102-3 is the next closest to the first mobile device 102-1, the RSS of the respective short-range communication link 502 is understood to be higher than the short-range communication link 106 but less than the respective short-range communication link 502 associated with the fourth mobile device 102-4.

Similarly, as the second mobile device 102-2 is furthest from the first mobile device 102-1, the RSS of the respective short-range communication link 106 is understood to be lower than the other short-range communication links 502.

Hence, the first mobile device 102-1 determines that the RSS of the respective short-range communication link 502 for the fourth mobile device 102-4 is higher than the RSS of the respective short-range communication link 502 for the third mobile device 102-3, and further determines that the RSS of the respective short-range communication link 502 for the third mobile device 102-3 is higher than the RSS of the respective short-range communication link 106 for the second mobile device 102-2.

Furthermore, the first mobile device 102-1 renders, at the first display screen 110-1, within the emergency assistance application 108-1, respective indicators of the respective identifiers 112-2, 112-3, 112-4, as decrypted, in an order of RSS. Hence, the respective indicators of the respective identifiers 112-2, 112-3, 112-4 are rendered in a list at the first display screen 110-1 in an order of identifier 112-4, identifier 112-3, identifier 112-2. It is understood that the emergency assistance application 108-1 as depicted in FIG. 5, is in a mode different from that of FIG. 1, and the depicted mode may be entered when the victim assistance button 130 is actuated.

As depicted, the respective indicators of the respective identifiers 112-2, 112-3, 112-4 are boxes with text "Identifier4", "Identifier3" and "Identifier2", and in the ordered list, respective indicators of the respective identifiers 112 that are higher in the ordered list are associated with a higher respective RSS.

However, unless the first user 104-1 specifically knows which of the users 104-2, 104-3, 104-4 correspond to the identifiers 112-2, 112-3, 112-4, such that the first user 104-1 may select the respective indicator of the second identifier 112-2 accordingly, the first user 104-1 may not know which of the respective indicators of the respective identifiers 112-2, 112-3, 112-4 to select (e.g., unless the respective identifiers 112-2, 112-3, 112-4 and/or a respective indicator thereof includes an image of a respective user 104-2, 104-3, 104-4, and the like).

To cause the respective RSS of the short-range communication links 106, 502 to change, the first user 104-1 may carry the first mobile device 102-1 towards the second (e.g., incapacitated) user 104-2 and the second mobile device 102-2 to cause the RSS of the short-range communication link 106 to increase relative to RSS of the short-range communication links 502.

Indeed, in this example, the method 300 may further comprise, the controller 218, and/or the first mobile device 102-1: rearranging, via the first mobile device 102-1, at the display screen 110-1, the respective indicators of the respective identifiers 112 as the respective RSS changes.

For example, attention is next directed to FIG. 6, which depicts the system 100 after the first user 104-1 has carried the first mobile device 102-1 to the second (e.g., incapacitated) user 104-2 and the second mobile device 102-2 such that the first mobile device 102-1 is closest to the second mobile device 102-2, as compared to the additional mobile devices 102-3, 102-4. As such, the RSS of the short-range communication link 106 to understood to be the highest of the short-range communication links 106, 502.

Consequently, the first mobile device 102-1 has rearranged the respective indicators of the respective identifiers 112-2, 112-3, 112-4 accordingly, such that the respective indicator of the second identifier 112-2 is now at a top of the ordered list of the respective indicators of the respective identifiers 112. The first user 104-1 may hence determine that, as the respective indicator of the second identifier 112-2 moved to the top of the ordered list of identifiers 112 when the mobile devices 102-1, 102-2 were closest to each other, as compared to the position of the first mobile device 102-1 relative to the additional mobile devices 102-3, 102-4, the second identifier 112-2 is associated with the second mobile device 102-2 and/or the second user 104-2. As such, as also depicted in FIG. 6, the first user 104-1 selects the respective indicator of the second identifier 112-2 (e.g., by touching the respective indicator of the second identifier 112-2 at a touch screen of the first display screen 110-1 as indicated by the line 699) and the first mobile device 102-1 responsively provides the second identifier 112-2 to the emergency service provider server 122 via the long-range communication link 126.

However, there are other processes by which an ordered list may be rearranged to provide the first user 104-1 with some assurance that the appropriate identifier 112 is to be selected.

For example, the method 300 may further comprise, the controller 218, and/or the first mobile device 102-1: detecting movement of the first mobile device 102-1 using the motion detector 222 of the first mobile device 102-1; and rearranging at the display screen 110-1, the respective indicators according to the respective RSS as the respective RSS changes according to the movement.

Figure 7:
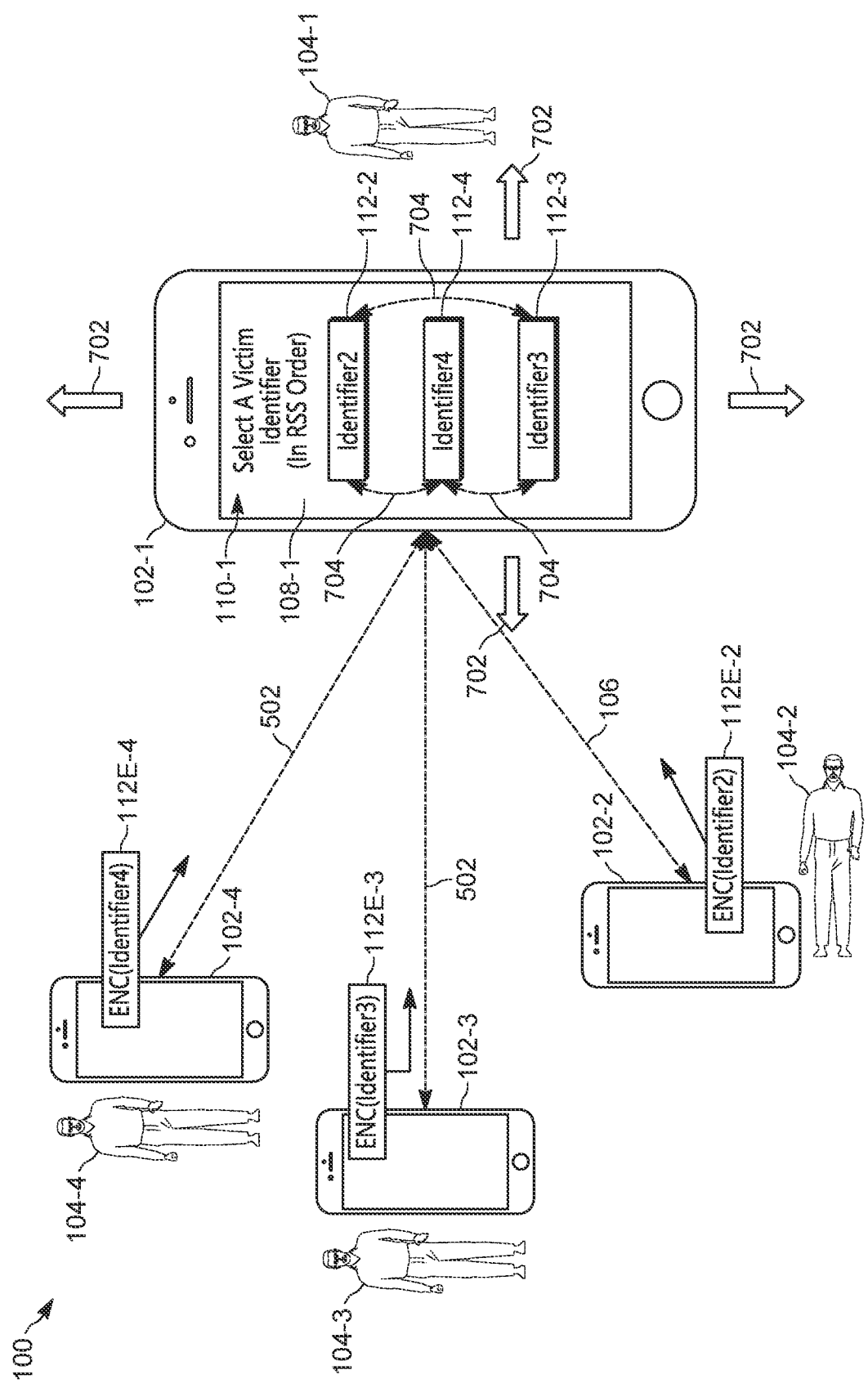
FIG. 7 depicts a portion of the system of FIG. 1 implementing yet further aspects of a method for emergency personal data access using different communication interface types is implemented, in accordance with some examples.

For example, attention is next directed to FIG. 7, which is substantially similar to FIG. 6, with like components having like numbers. As depicted in FIG. 7, the first user 104-1 is moving and/or waving the first mobile device 102-1 in different directions, for example towards different mobile devices 102-2, 102-3, 102-4 as represented by the hollow arrows 702. It is understood that the moving and/or waving of the first mobile device 102-1 may occur in any suitable direction.

As the moving and/or waving occurs, which may be detected by the motion detector 222, the respective RSS of the short-range communication links 106, 502 changes, causing the identifiers 112-2, 112-3, 112-4 to rearrange in the ordered list depicted at the first display screen 110-1, such rearranging represented by the dashed arcs 704. In particular, the first user 104-1 may move and/or wave the first mobile device 102-1 towards and away from the second mobile device 102-2 and/or the second (incapacitated) user 104-2. The first user 104-1 may observe the respective indicator of the second identifier 112-2 moving towards the top of the ordered list as the first mobile device 102-1 is waved towards the second mobile device 102-2 (e.g., due to concurrent increases in respective RSS), and, conversely, the first user 104-1 may observe the respective indicator of the second identifier 112-2 moving away from the top of the ordered list as the first mobile device 102-1 is waved away the second mobile device 102-2 (e.g., due to concurrent decreases in respective RSS). As such, the first user 104-1 may determine that the second identifier 112-2 is associated with the second mobile device 102-2 and/or the second user 104-2 and select/confirm the respective indicator of the second identifier 112-2 accordingly. While such selection/confirmation is not depicted in FIG. 7, such selection/confirmation may be similar to as depicted in FIG. 6.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic alerts, cannot decrypt information, cannot detect RSS, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, at a first mobile device, actuation of a victim assistance button of an emergency assistance application provided at a display screen of the first mobile device, the emergency assistance application associated with a first identifier of a first emergency profile associated with a first user of the first mobile device;
    receiving, via the first mobile device, from a second mobile device, using a short-range communication interface of the first mobile device, a second identifier of a second emergency profile associated with a second user of the second mobile device, the second identifier being encrypted and decryptable using a common decryption key associated with the emergency assistance application;

decrypting, via the first mobile device, the second identifier using the common decryption key; and providing, via the first mobile device, to an emergency service provider server, using a long-range communication interface of the first mobile device, the second identifier, the second identifier enabling the emergency service provider server to retrieve the second emergency profile from a data storage module of an emergency information system at which the first emergency profile of the first user, and the second emergency profile of the second user are registered.

2. The method of claim 1, further comprising:
rendering, via the first mobile device, at the display screen, the second identifier as decrypted;
receiving, via the first mobile device, within the emergency assistance application, a selection of the second identifier; and
providing, via the first mobile device, to the emergency service provider server, the second identifier in response to receiving the selection.

3. The method of claim 1, further comprising, in response to receiving the actuation:
requesting, via the first mobile device, from the emergency service provider server, the common decryption key; and,
receiving, via the first mobile device, from the emergency service provider server, the common decryption key.

4. The method of claim 1, further comprising:
retrieving, via the first mobile device, the common decryption key from a memory of the first mobile device.

5. The method of claim 1, wherein the second mobile device is broadcasting the second identifier via a respective short-range communication interface, and the method further comprises, in response to receiving the actuation
searching, via the first mobile device, using the short-range communication interface, for the second identifier as broadcast by the second mobile device.

6. The method of claim 1, further comprising, in response to receiving the actuation:
broadcasting, via the first mobile device, using the short-range communication interface, a trigger to cause the second mobile device to broadcast the second identifier of the second emergency profile, the second identifier received in response to broadcasting the trigger.

7. The method of claim 1, further comprising, in response to receiving the actuation:
requesting, via the first mobile device, from the emergency service provider server, the common decryption key;
receiving, via the first mobile device, from the emergency service provider server, the common decryption key; and
in response to receiving the common decryption key, broadcasting, via the first mobile device, using the short-range communication interface, a trigger to cause other mobile devices proximal the first mobile device, including the second mobile device, to broadcast respective identifiers of respective emergency profiles, the second identifier received in response to broadcasting the trigger.

8. The method of claim 1, further comprising:
receiving, via the first mobile device, using the short-range communication interface, respective identifiers of respective emergency profiles of other mobile devices proximal the first mobile device, including the second mobile device;
in response to receiving the actuation, rendering, via the first mobile device, at the display screen, within the emergency assistance application, respective indicators of the respective identifiers, in an order of respective received signal strength (RSS);
receiving, via the first mobile device, within the emergency assistance application, a selection of a respective indicator of the second identifier from among the respective indicators; and
providing, via the first mobile device, to the emergency service provider server, the second identifier in response to receiving the selection.

9. The method of claim 8, further comprising:
rearranging, via the first mobile device, at the display screen, the respective indicators as the respective RSS changes.

10. The method of claim 8, further comprising:
detecting, via the first mobile device, movement of the first mobile device using a motion detector of the first mobile device; and
rearranging, via the first mobile device, at the display screen, the respective indicators according to the respective RSS as the respective RSS changes according to the movement.

11. A mobile device comprising:
a display screen;
a short-range communication interface;
a long-range communication interface;
a controller; and
a computer-readable storage medium having stored thereon program instructions that, when executed by the controller, cause the controller to perform a set of operations comprising:
receiving actuation of a victim assistance button of an emergency assistance application provided at the display screen, the emergency assistance application associated with a first identifier of a first emergency profile associated with a first user of the mobile device;
receiving, from a second mobile device, using the short-range communication interface, a second identifier of a second emergency profile associated with a second user of the second mobile device, the second identifier being encrypted and decryptable using a common decryption key associated with the emergency assistance application;
decrypting the second identifier using the common decryption key; and
providing, to an emergency service provider server, using the long-range communication interface, the second identifier, the second identifier enabling the emergency service provider server to retrieve the second emergency profile from a data storage module of an emergency information system at which the first emergency profile of the first user, and the second emergency profile of the second user are registered.

12. The mobile device of claim 11, wherein the set of operations further comprises:
rendering, at the display screen, the second identifier as decrypted;

receiving, within the emergency assistance application, a selection of the second identifier; and providing, to the emergency service provider server, the second identifier in response to receiving the selection.

13. The mobile device of claim 11, wherein the set of operations further comprises, in response to receiving the actuation:

requesting, from the emergency service provider server, the common decryption key; and, receiving, from the emergency service provider server, the common decryption key.

14. The mobile device of claim 11, wherein the set of operations further comprises:

retrieving the common decryption key from a memory of the first mobile device.

15. The mobile device of claim 11, wherein the second mobile device is broadcasting the second identifier via a respective short-range communication interface, and wherein the set of operations further comprises, in response to receiving the actuation:

searching, using the short-range communication interface, for the second identifier as broadcast by the second mobile device.

16. The mobile device of claim 11, wherein the set of operations further comprises, in response to receiving the actuation:

broadcasting, via the first mobile device, using the short-range communication interface, a trigger to cause the second mobile device to broadcast the second identifier of the second emergency profile, the second identifier received in response to broadcasting the trigger.

17. The mobile device of claim 11, wherein the set of operations further comprises, in response to receiving the actuation:

requesting, via the first mobile device, from the emergency service provider server, the common decryption key;

receiving, via the first mobile device, from the emergency service provider server, the common decryption key; and in response to receiving the common decryption key, broadcasting, via the first mobile device, using the short-range communication interface, a trigger to cause other mobile devices proximal the first mobile device, including the second mobile device, to broadcast respective identifiers of respective emergency profiles, the second identifier received in response to broadcasting the trigger.

18. The mobile device of claim 11, wherein the set of operations further comprises:

receiving, via the first mobile device, using the short-range communication interface, respective identifiers of respective emergency profiles of other mobile devices proximal the first mobile device, including the second mobile device;

in response to receiving the actuation, rendering, via the first mobile device, at the display screen, within the emergency assistance application, respective indicators of the respective identifiers, in an order of respective received signal strength (RSS);

receiving, via the first mobile device, within the emergency assistance application, a selection of a respective indicator of the second identifier from among the respective indicators; and providing, via the first mobile device, to the emergency service provider server, the second identifier in response to receiving the selection.

19. The mobile device of claim 18, wherein the set of operations further comprises:

rearranging, via the first mobile device, at the display screen, the respective indicators as the respective RSS changes.

20. The mobile device of claim 18, wherein the set of operations further comprises:

detecting, via the first mobile device, movement of the first mobile device using a motion detector of the first mobile device; and rearranging, via the first mobile device, at the display screen, the respective indicators according to the respective RSS as the respective RSS changes according to the movement.

* * * * *